US012582168B2

(12) United States Patent
Mironov et al.

(10) Patent No.: US 12,582,168 B2
(45) Date of Patent: Mar. 24, 2026

(54) CARTRIDGE HAVING A SUSCEPTOR MATERIAL

(71) Applicant: Altria Client Services LLC, Richmond, VA (US)

(72) Inventors: Oleg Mironov, Cudrefin (CH); Enrico Stura, Palezieux-Village (CH)

(73) Assignee: Altria Client Services LLC, Richmond, VA (US)

(*) Notice: Subject to any disclaimer, the term of this patent is extended or adjusted under 35 U.S.C. 154(b) by 0 days.

(21) Appl. No.: 18/465,523

(22) Filed: Sep. 12, 2023

(65) Prior Publication Data

US 2023/0422358 A1 Dec. 28, 2023

Related U.S. Application Data

(63) Continuation of application No. 16/002,322, filed on Jun. 7, 2018, now Pat. No. 11,785,677, which is a (Continued)

(30) Foreign Application Priority Data

Jun. 8, 2017 (EP) .................................... 17175090

(51) Int. Cl.
*A24F 40/465* (2020.01)
*A24B 15/167* (2020.01)
(Continued)

(52) U.S. Cl.
CPC .......... *A24F 40/465* (2020.01); *A24B 15/167* (2016.11); *A24D 1/002* (2013.01);
(Continued)

(58) Field of Classification Search
CPC ....... A24B 15/167; A24D 1/002; H05B 6/108
See application file for complete search history.

(56) References Cited

U.S. PATENT DOCUMENTS

| | | | | |
|---|---|---|---|---|
| 5,613,505 A * | 3/1997 | Campbell | H05B 6/365 131/194 |
| 2015/0320116 A1* | 11/2015 | Bleloch | A24F 40/465 219/628 |

(Continued)

FOREIGN PATENT DOCUMENTS

| | | |
|---|---|---|
| CN | 105307523 A | 2/2016 |
| CN | 105916399 A | 8/2016 |

(Continued)

OTHER PUBLICATIONS

European Search Report for European Patent Application No. 17175090 dated Nov. 10, 2017.

(Continued)

*Primary Examiner* — Steven W Crabb
*Assistant Examiner* — Dilnessa B Belay
(74) *Attorney, Agent, or Firm* — Harness, Dickey & Pierce, P.L.C.

(57) ABSTRACT

A cartridge for an aerosol-generating system may include a container, a susceptor material, and an aerosol-forming substrate. The container defines a cartridge cavity. The susceptor material is positioned within the cartridge cavity. The susceptor material may define a plurality of interconnected interstices. The aerosol-forming substrate may be in the form of a gel that is solid at room temperature. The gel may be provided so as to be positioned within the plurality of interconnected interstices.

20 Claims, 3 Drawing Sheets

Related U.S. Application Data continuation of application No. PCT/EP2018/063840, filed on May 25, 2018.

(51) Int. Cl.

| | |
|---|---|
| ***A24D 1/00*** | (2020.01) |
| ***A24F 40/20*** | (2020.01) |
| ***A24F 40/40*** | (2020.01) |
| ***A24F 40/42*** | (2020.01) |
| ***A24F 40/70*** | (2020.01) |
| ***H05B 6/10*** | (2006.01) |

(52) U.S. Cl.

CPC .............. *A24F 40/42* (2020.01); *A24F 40/70* (2020.01); *H05B 6/108* (2013.01); *A24F 40/20* (2020.01); *A24F 40/40* (2020.01)

(56) References Cited

U.S. PATENT DOCUMENTS

| | | | | |
|---|---|---|---|---|
| 2016/0120221 | A1 | 5/2016 | Mironov et al. | |
| 2016/0205727 | A1 | 7/2016 | Meinhart et al. | |
| 2016/0295921 | A1 | 10/2016 | Mironov et al. | |
| 2017/0055574 | A1 | 3/2017 | Kaufman et al. | |
| 2018/0289067 | A1 * | 10/2018 | Courbat .................. | A24F 40/44 |

FOREIGN PATENT DOCUMENTS

| | | | | |
|---|---|---|---|---|
| CN | 106255429 | A | 12/2016 | |
| CN | 106535680 | A | 3/2017 | |
| IN | 201617024360 | | 7/2016 | |
| JP | 2017-520234 | A | 7/2017 | |
| KR | 101515882 | B1 | 4/2015 | |
| RU | 2600912 | C1 | 10/2016 | |
| WO | WO-2015/117700 | A1 | 8/2015 | |
| WO | WO-2015/177046 | A1 | 11/2015 | |
| WO | WO-2015177043 | A1 | 11/2015 | |
| WO | WO-2015177265 | A1 | 11/2015 | |
| WO | WO-2015198015 | A1 | 12/2015 | |
| WO | WO-2016/133109 | A1 | 8/2016 | |
| WO | WO-2017/068096 | A1 | 4/2017 | |
| WO | WO-2017068095 | A1 | 4/2017 | |
| WO | WO-2017178394 | A1 * | 10/2017 | ............... A24D 1/20 |
| WO | WO-2018019543 | A1 * | 2/2018 | ........... A24B 15/167 |
| WO | WO-2018019738 | A1 | 2/2018 | |

OTHER PUBLICATIONS

International Preliminary Report on patentability dated Dec. 19, 2019 for corresponding International Application No. PCT/EP2018/063840.

Russian Search Report for RU Application 2019139235, dated Sep. 2, 2021, with English Translation.

Russian Decision of Grant for RU Application 2019139235, dated Sep. 8, 2021, with English translation.

Japanese Office Action for JP Application 2019-563097 dated Jun. 27, 2022, with English translation (10 pages).

Chinese Office Action for CN Application 201880032185.0 dated Aug. 8, 2022, with English language translation (19 pages).

Brazilian Office Action for BR Patent Application No. 1120190238336 dated Jul. 21, 2022, with English language translation (5 pages).

Japanese Office Action for corresponding JP Application 2019-563097 dated Dec. 14, 2022, with English language translation (8 pages).

South Korean Office Action for KR Application No. 10-2019-7035215 dated Jan. 18, 2023, with English language translation (8 pages).

South Korean Notice of Allowance for KR Application No. 10-2019-7035215 dated Mar. 21, 2023, with English language translation (4 pages).

Japanese Decision to Grant for corresponding JP Application 2019-563097 dated Apr. 24, 2023, with English language translation (5 pages).

Philippines Office Action for corresponding PH Patent Application No. 1-2019-502179, dated May 17, 2023 (received Jun. 22, 2023) (5 pages).

Brazilian Office Action for BR Application 112019023833-6 dated Dec. 26, 2023 with English language translation (12 pages).

Malaysian Office Action for MY Patent Application No. PI2019005958 dated Nov. 22, 2023, with English language translation.

Notice of Allowance dated Apr. 17, 2024 issued in related Philippines Patent Application No. 1-2019-502179.

* cited by examiner

CARTRIDGE HAVING A SUSCEPTOR MATERIAL

CROSS-REFERENCE TO RELATED APPLICATIONS

This is a continuation of and claims priority to U.S. patent application Ser. No. 16/002,322, filed on Jun. 7, 2018, which is a continuation of and claims priority to PCT/EP2018/063840, filed on May 25, 2018, and further claims priority to EP 17175090.4, filed on Jun. 8, 2017, the entire contents of each of which are hereby incorporated by reference in their entirety.

BACKGROUND

Field

Example embodiments relate to a cartridge for an aerosol-generating system, the cartridge having a susceptor material. Example embodiments also relate to an aerosol-generating system comprising the cartridge, and a method of assembling the cartridge.

Description of Related Art

Aerosol-generating systems that operate by heating a liquid formulation to generate an aerosol typically comprise a device portion and a cartridge. In some systems, the device portion contains a power supply and control electronics, and the cartridge contains a liquid reservoir holding the liquid formulation, a heater for vaporising the liquid formulation, and a wick that transports the liquid from the liquid reservoir to the heater. One disadvantage of such systems is the potential for leakage of the liquid from the liquid reservoir both during transport and storage, and when the cartridge is connected to the device portion. The use of a wick to transport the liquid from the reservoir to the heater may add complexity to the system. Another disadvantage is the increased cost of the cartridge resulting from the incorporation of the heater within the cartridge.

SUMMARY

A cartridge for an aerosol-generating system may include a container, a susceptor material, and an aerosol-forming substrate. The container defines a cartridge cavity. The susceptor material is positioned within the cartridge cavity. The susceptor material may define a plurality of interconnected interstices. The aerosol-forming substrate may be provided so as to be within the plurality of interconnected interstices. The aerosol-forming substrate may be a gel with a stable form at room temperature.

The susceptor material may include a ferromagnetic metallic material.

The susceptor material may include at least one of ferritic iron, ferromagnetic steel, stainless steel, or aluminium.

The susceptor material may include a metallic wool.

The metallic wool may include a bundle of metallic filaments defining spaces in between that form the plurality of interconnected interstices.

The susceptor material may include a metallic foam.

The metallic foam may be an open-cell foam defining open cells that form the plurality of interconnected interstices.

The cartridge cavity may be a blind cavity having a closed end and an open end.

The cartridge may include a seal extending across the open end of the cartridge cavity so that the susceptor material and the aerosol-forming substrate are sealed within the cartridge cavity by the seal.

The gel may be a thermoreversible gel.

The gel may have a melting temperature of at least 50 degrees Celsius.

The gel may include at least one of nicotine or a tobacco product.

An aerosol-generating system may include a cartridge and an aerosol-generating device. The cartridge may include a container, a susceptor material, and an aerosol-forming substrate. The container defines a cartridge cavity. The susceptor material is positioned within the cartridge cavity. The susceptor material may define a plurality of interconnected interstices. The aerosol-forming substrate may be provided so as to be within the plurality of interconnected interstices. The aerosol-forming substrate may be a gel with a stable form at room temperature. The aerosol-generating device may include a housing, an electrical heater, an electrical power supply, and a controller. The housing defines a device cavity configured to receive the cartridge. The electrical heater includes an inductive heating element configured to heat the susceptor material when the cartridge is received within the device cavity. The controller is configured to control a supply of electrical power from the electrical power supply to the electrical heater.

A method of assembling a cartridge for an aerosol-generating system may include providing a container defining a cartridge cavity. The method may additionally include inserting a susceptor material into the cartridge cavity. The susceptor material may define a plurality of interconnected interstices. The method may also include introducing a liquid aerosol-forming substrate into the cartridge cavity. The method may further include gelating the liquid aerosol-forming substrate to form a gel with a stable form at room temperature. The gel may be within the plurality of interconnected interstices.

The cartridge cavity may be a blind cavity having a closed end and an open end. The method may also include positioning a seal across the open end of the cartridge cavity. The method may further include securing the seal to the container so that the susceptor material and the gel are sealed within the cartridge cavity by the seal.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
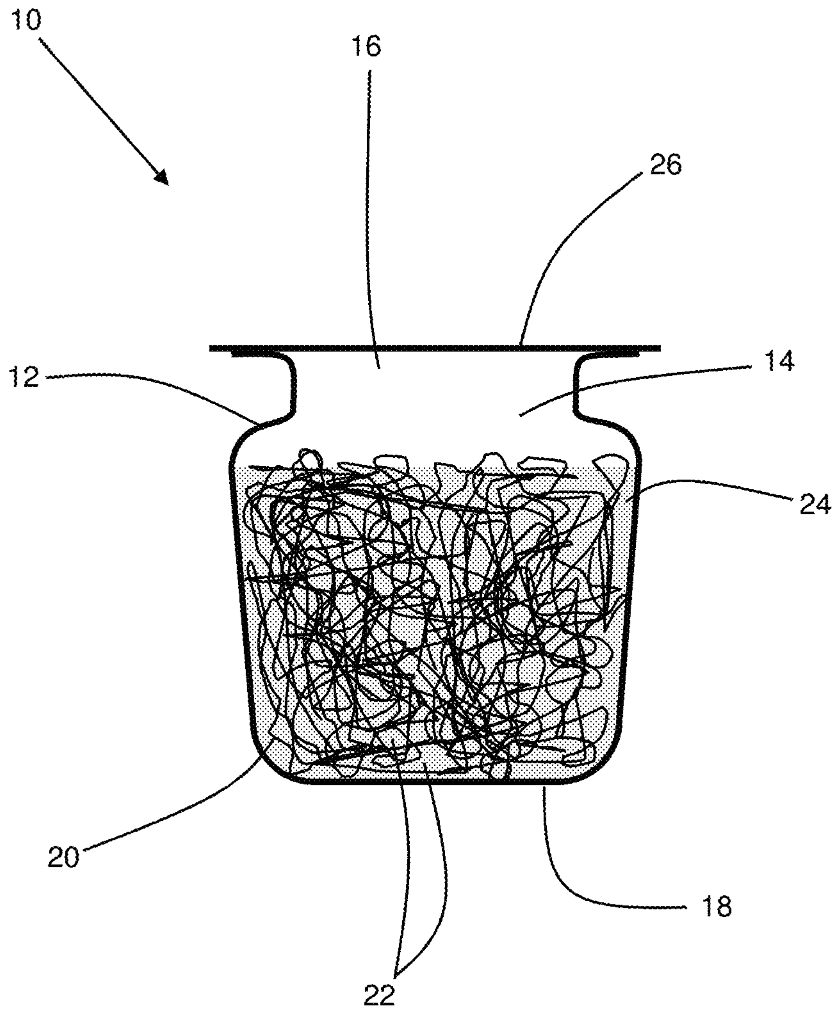
FIG. 1 is a cross-sectional view of a cartridge according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

According to some example embodiments, there is provided a cartridge for an aerosol-generating or e-vaping system, the cartridge comprising a container defining a cartridge cavity, a susceptor material positioned within the cartridge cavity, and an aerosol-forming substrate or pre-vapor formulation. The susceptor material defines a plurality of interconnected interstices and the aerosol-forming substrate is in the form of a gel that is solid at room temperature, wherein the gel is positioned within the plurality of interconnected interstices.

The term "susceptor" is used herein to refer to a material that is capable of being inductively heated. That is, a susceptor material is capable of absorbing electromagnetic energy and converting it to heat.

The gel is a solid at room temperature. "Solid" in this context means that the gel has a stable size and shape and does not flow. Room temperature in this context means 25 degrees Celsius.

Contacting the aerosol-forming substrate with a susceptor material facilitates heating of the aerosol-forming substrate without requiring contact between the aerosol-forming substrate and an electrical heater. For example, the cartridge may be combined with an aerosol-generating device comprising an electrical heater in the form of an induction coil, wherein the induction coil heats the susceptor material by inductive heating. Eliminating the need for direct contact between the aerosol-forming substrate and the electrical heater facilitates reuse of the aerosol-generating device with multiple cartridges without contaminating the electrical heater.

Providing a susceptor material defining a plurality of interstices, wherein the aerosol-forming substrate is positioned within the plurality of interstices, increases the contact area between the susceptor material and the aerosol-forming substrate. Increasing the contact area between the susceptor material and the aerosol-forming substrate facilitates thermal transfer from the susceptor material to the aerosol-forming substrate. This increased contact area may minimise the inductive heating of the susceptor material that is required to vaporise the aerosol-forming substrate.

Providing a susceptor material with a plurality of interstices that are interconnected facilitates loading of the interstices with the aerosol-forming substrate during manufacture of the cartridge. For example, in non-limiting embodiments in which the aerosol-forming substrate is inserted into the cartridge cavity in a liquid form, the aerosol-forming substrate may be drawn into the plurality of interconnected interstices by a capillary action.

Providing a susceptor material with a plurality of interstices that are interconnected facilitates release of vaporised aerosol-forming substrate from the susceptor material during heating.

Providing the aerosol-forming substrate in the form of a gel that is solid at room temperature facilitates retention of the aerosol-forming substrate within the plurality of interconnected interstices prior to heating of the susceptor material. In an example embodiment, the aerosol-forming substrate will not flow out of the plurality of interconnected interstices while the aerosol-forming substrate remains in a gel form.

The susceptor material may comprise a ferromagnetic metallic material. The susceptor material may comprise at least one of ferritic iron, ferromagnetic steel, stainless steel, and aluminium. Different materials will generate different amounts of heat when positioned within electromagnetic fields having similar values of frequency and field strength.

Therefore, the susceptor material may be selected to provide a desired power dissipation within a known electromagnetic field.

In example embodiments in which the susceptor material comprises stainless steel, the susceptor material may comprise at least one 400 series stainless steel. Suitable 400 series stainless steels include grade 410, grade 420, and grade 430.

The susceptor material may comprise a metallic wool. The metallic wool may be formed from any of the metallic susceptor materials described herein. The metallic wool may comprise a bundle of metallic filaments, wherein spaces between the metallic filaments form the plurality of interconnected interstices.

The susceptor material may comprise a metallic foam. The metallic foam may be formed from any of the metallic susceptor materials described herein. The metallic foam may be an open-cell foam, wherein the open cells form the plurality of interconnected interstices.

The susceptor material may comprise a protective coating encapsulating the surface of the susceptor material. The protective coating may prevent direct contact between the susceptor material and the aerosol-forming substrate positioned within the plurality of interconnected interstices. This indirect contact may prevent undesirable chemical reactions between the susceptor material and the aerosol-forming substrate. The protective coating may comprise at least one of a glass and a ceramic.

The cartridge cavity may be a blind cavity having a closed end and an open end. Providing a blind cartridge cavity may facilitate filling of the cartridge cavity with the susceptor material and the aerosol-forming substrate during manufacture of the cartridge.

The cartridge may further comprise a seal extending across the open end of the cartridge cavity so that the susceptor material and the aerosol-forming substrate are sealed within the cartridge cavity by the seal. The seal may comprise at least one of a polymeric film and a foil. The seal may comprise a metallic material. The seal may be secured to the container with at least one of an adhesive and a weld, such as an ultrasonic weld. The seal may be secured to the container about a periphery of the open end of the cartridge cavity.

The seal may comprise at least one frangible barrier. In example embodiments in which the seal comprises a frangible barrier, the cartridge may be configured for use with an aerosol-generating device comprising a piercing element for rupturing the frangible barrier.

The seal may comprise at least one removable barrier.

The seal may comprise a vapour permeable element configured to allow the release of vapour from the cartridge cavity through the vapour permeable element. The vapour permeable element may comprise at least one of a membrane or a mesh.

The seal may comprise a pressure activated valve that allows for the release of vapour through the valve when a pressure difference across the valve exceeds a threshold pressure difference.

The gel may be a thermoreversible gel. The term "thermoreversible" is used herein to mean that the gel will become fluid when heated to a melting temperature and will set into a gel again at a gelation temperature. In an example embodiment, the gelation temperature is at or above room temperature and atmospheric pressure. Atmospheric pressure means a pressure of 1 atmosphere. The melting temperature is higher than the gelation temperature.

The gel may have a melting temperature of at least about 50 degrees Celsius (e.g., at least about 60 degrees Celsius, at least about 70 degrees Celsius, at least about 80 degrees Celsius). The melting temperature in this context means the temperature at which the gel is no longer solid and begins to flow.

The gel may comprise a gelling agent. The gel may comprise at least one of agar, agarose, or sodium alginate. The gel may comprise Gellan gum. The gel may comprise a mixture of materials. The gel may comprise water.

The gel may comprise an aerosol-former. As used herein, the term "aerosol-former" refers to any suitable known compound or mixture of compounds that, in use, facilitates formation of a dense and stable aerosol. An aerosol-former is substantially resistant to thermal degradation at the operating temperature of the cartridge. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Suitable aerosol formers are polyhydric alcohols or mixtures thereof, such as triethylene glycol, 1,3-butanediol and glycerine or polyethylene glycol.

The gel may comprise at least one of nicotine or a tobacco product. Additionally, or alternatively, the gel may comprise another target compound. In example embodiments in which the gel comprises nicotine, the nicotine may be included in the gel with an aerosol-former. Providing the nicotine in the gel can prevent leakage of the nicotine from the cartridge at room temperature when compared to alternative cartridges in which the nicotine is provided in a liquid at room temperature.

When agar is used as a gelling agent, the gel may comprise between about 0.5 percent and about 5 percent by weight agar (e.g., between about 0.8 percent and about 1 percent by weight agar). The gel may further comprise between about 0.1 percent and about 2 percent by weight nicotine. The gel may further comprise between about 30 percent and about 90 percent by weight glycerine (e.g., between about 70 percent and about 90 percent by weight glycerine). A remainder of the gel may comprise water and any flavourings.

When Gellan gum is used as a gelling agent, the gel may comprise between about 0.5 percent and about 5 percent by weight Gellan gum. The gel may further comprise between about 0.1 percent and about 2 percent by weight nicotine. The gel may further comprise between about 30 percent and about 99.4 percent by weight glycerine. A remainder of the gel may comprise water and any flavourings.

In one embodiment, the gel comprises 2 percent by weight nicotine, 70 percent by weight glycerol, 27 percent by weight water and 1 percent by weight agar. In another embodiment, the gel comprises 65 percent by weight glycerol, 20 percent by weight water, 14.3 percent by weight tobacco and 0.7 percent by weight agar.

The cartridge may have any suitable shape. The cartridge may be substantially cylindrical. As used herein, the terms "cylinder" and "cylindrical" refer to a substantially right circular cylinder with a pair of opposed substantially planar end faces.

The cartridge may have any suitable size.

The cartridge may have a length between about 5 millimetres and about 30 millimetres. For example, the cartridge may have a length of about 12 millimetres.

The cartridge may have a diameter between about 4 millimetres and about 10 millimetres. For example, the cartridge may have a diameter of about 7 millimetres.

Suitable materials for forming the container include, but are not limited to, metal, aluminium, polymer, polyether ether ketone (PEEK), polyimides, such as Kapton®, polyethylene terephthalate (PET), polyethylene (PE), polypropylene (PP), polystyrene (PS), fluorinated ethylene propylene (FEP), polytetrafluoroethylene (PTFE), epoxy resins, polyurethane resins and vinyl resins.

The container may be formed by any suitable method. Suitable methods include, but are not limited to, deep drawing, injection moulding, blistering, blow forming and extrusion.

The cartridge may comprise a mouthpiece. Where the cartridge comprises a mouthpiece, the mouthpiece may comprise a filter. The filter may have a low particulate filtration efficiency or very low particulate filtration efficiency. Alternatively, the mouthpiece may comprise a hollow tube. The mouthpiece may comprise an airflow modifier, for example a restrictor.

The cartridge may be provided within a mouthpiece tube. The mouthpiece tube may comprise an aerosol-forming chamber. The mouthpiece tube may comprise an airflow restrictor. The mouthpiece tube may comprise a filter. The mouthpiece tube may comprise a cardboard housing. The mouthpiece tube may comprise one or more vapour impermeable elements within the cardboard tube. The mouthpiece tube may have a diameter similar to a conventional cigarette, for example about 7 millimetres. The mouthpiece tube may have a mouth end. The cartridge may be held in the mouthpiece tube, for example at an opposite end to the mouth end.

According to some example embodiments, there is provided an aerosol-generating or e-vaping system comprising an aerosol-generating or e-vaping device and a cartridge in accordance with any of the non-limiting embodiments described herein. The aerosol-generating device comprises a housing defining a device cavity for receiving the cartridge, and an electrical heater comprising an inductive heating element arranged to heat the susceptor material when the cartridge is received within the device cavity. The aerosol-generating device further comprises an electrical power supply and a controller for controlling a supply of electrical power from the electrical power supply to the electrical heater.

The inductive heating element may comprise at least one induction coil extending around at least a portion of the device cavity. The induction coil may extend completely around the device cavity. The induction coil may be wound around the device cavity with a plurality of windings.

The inductive heating element may comprise at least one planar induction coil. Each planar induction coil may comprise a flat spiral induction coil.

As used herein a “flat spiral induction coil” means a coil that is generally planar, wherein the axis of winding of the coil is normal to the surface in which the coil lies. In some example embodiments, the flat spiral coil may be planar in the sense that it lies in a flat Euclidean plane. However, the term “flat spiral induction coil” as used herein covers coils that are shaped to conform to a curved plane or other three dimensional surface. For example, a flat spiral coil may be shaped to conform to a cylindrical housing or cavity of the device. The flat spiral coil can then be said to be planar but conforming to a cylindrical plane, with the axis of winding of the coil normal to the cylindrical plane at the centre of the coil. If the flat spiral coil conforms to a cylindrical plane or non-Euclidian plane, the flat spiral coil may lie in a plane having a radius of curvature in the region of the flat spiral coil greater than a diameter of the flat spiral coil.

The power source may be a battery, such as a rechargeable lithium ion battery. Alternatively, the power source may be another form of charge storage device such as a capacitor. The power source may require recharging. The power source may have a capacity that allows for the storage of enough energy for one or more uses of the device. For example, the power source may have sufficient capacity to allow for the continuous generation of aerosol for a period of around six minutes, corresponding to the typical time taken to smoke a conventional cigarette, or for a period that is a multiple of six minutes. In another example, the power source may have sufficient capacity to allow for a predetermined number of puffs or discrete activations.

The controller and the electrical power supply may be configured so that, during use, a high frequency oscillating current is passed through the inductive heating element to generate an alternating magnetic field that induces a voltage in the susceptor material. As used herein, a “high frequency oscillating current” means an oscillating current having a frequency of between about 125 kilohertz and about 30 megahertz. The high frequency oscillating current may have a frequency of between about 1 megahertz and about 30 megahertz (e.g., between about 1 megahertz and about 10 megahertz, between about 5 megahertz and about 7 megahertz).

In an example embodiment, the aerosol-generating device is portable. The aerosol-generating device may have a size comparable to a conventional cigar or cigarette. The aerosol-generating device may have a total length between approximately 30 millimetres and approximately 150 millimetres. The aerosol-generating device may have an external diameter between approximately 5 millimetres and approximately 30 millimetres.

According to some example embodiments, there is provided a method of assembling a cartridge for an aerosol-generating system, the method comprising providing a container defining a cartridge cavity and inserting a susceptor material into the cartridge cavity, the susceptor material defining a plurality of interconnected interstices. The method also comprises inserting a liquid aerosol-forming substrate into the cartridge cavity and gelating the liquid aerosol-forming substrate to form a gel that is solid at room temperature, wherein the gel is positioned within the plurality of interconnected interstices. The cartridge may be a cartridge in accordance with any of the example embodiments described herein.

The term “gelating” is used herein to refer to the conversion of a liquid into a gel.

Inserting the aerosol-forming substrate into the cartridge cavity in a liquid form facilitates flow of the aerosol-forming substrate into the plurality of interconnected interstices. For example, the liquid aerosol-forming substrate may be drawn into the plurality of interconnected interstices by a capillary action.

During the step of introducing or inserting the liquid aerosol-forming substrate into the cartridge cavity, the liquid aerosol-forming substrate may be at an elevated temperature above room temperature. For example, the liquid aerosol-forming substrate may be at a temperature of at least about 50 degrees Celsius.

The step of gelating the liquid aerosol-forming substrate may comprise cooling the liquid aerosol-forming substrate. In example embodiments in which the liquid aerosol-forming substrate is inserted into the cartridge cavity at an elevated temperature, the liquid aerosol-forming substrate is cooled to room temperature during the gelating step. The gel may be a thermoreversible gel. The liquid aerosol-forming substrate may comprise a gelling agent.

The cartridge cavity may be a blind cavity having a closed end and an open end. The method may further comprise positioning a seal across the open end of the cartridge cavity and securing or sealing the seal to the container so that the susceptor material and the gel are sealed within the cartridge cavity by the seal. The seal may be positioned across the open end of the cartridge cavity before or after the gelating step. The seal may comprise any of the optional features described herein.

FIG. 1 shows a cross-sectional view of a cartridge 10 according to an example embodiment. The cartridge 10 comprises a container 12 defining a cartridge cavity 14 having an open end 16 and a closed end 18. Positioned within the cartridge cavity 14 is a susceptor material 20 that defines a plurality of interconnected interstices 22. In the example embodiment shown in FIG. 1, the susceptor material 20 comprises steel wool and the spaces between filaments of the steel wool form the plurality of interconnected interstices 22.

An aerosol-forming substrate 24 is also positioned within the cartridge cavity 14. For example, the aerosol-forming substrate 24 may be positioned so as to be within the plurality of interconnected interstices 22 of the susceptor material 20. At room temperature, the aerosol-forming substrate 24 is in the form of a gel, which prevents the aerosol-forming substrate 24 from flowing out of the plurality of interconnected interstices 22. The gel is a thermoreversible gel so that heating the gel to at least 50 degrees Celsius melts the gel such that the aerosol-forming substrate 24 has a liquid form.

The cartridge 10 also comprises a seal 26 extending across the open end 16 of the cartridge cavity 14, the seal comprising a frangible barrier and secured to the container 12 about a periphery of the open end 16 (e.g., by an ultrasonic weld).

Figure 2:
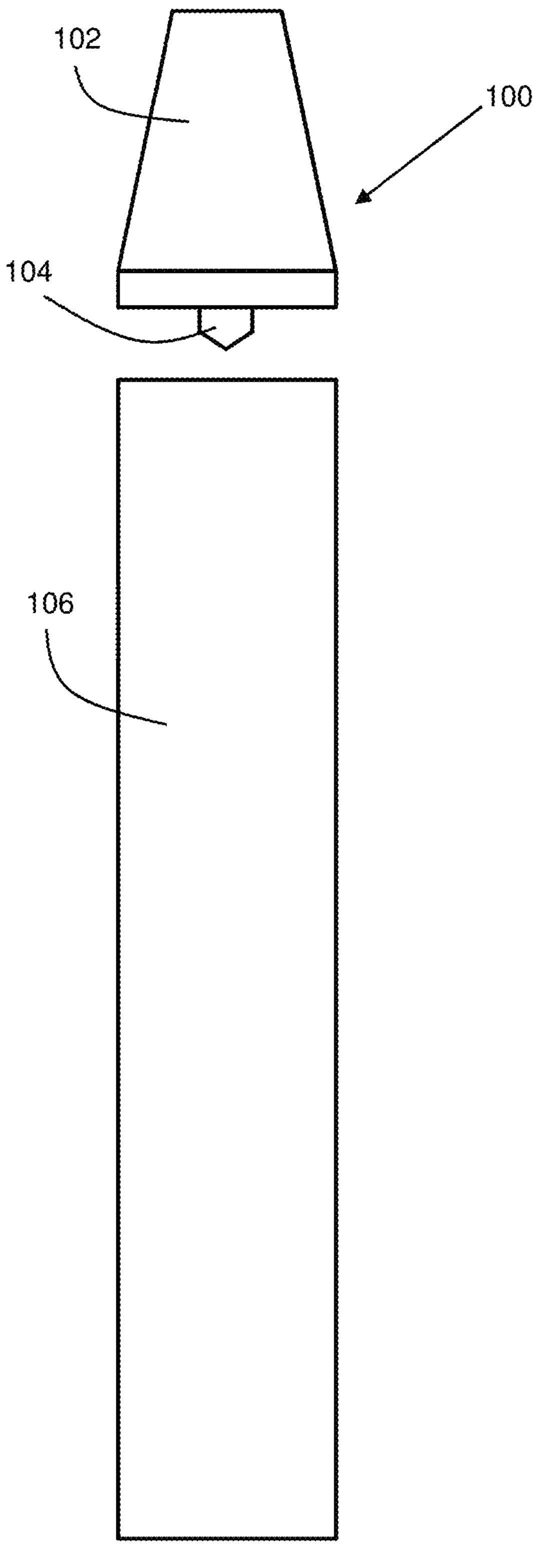
FIG. 2 is a side view of a partially assembled aerosol-generating system according to an example embodiment.
Figure 3:
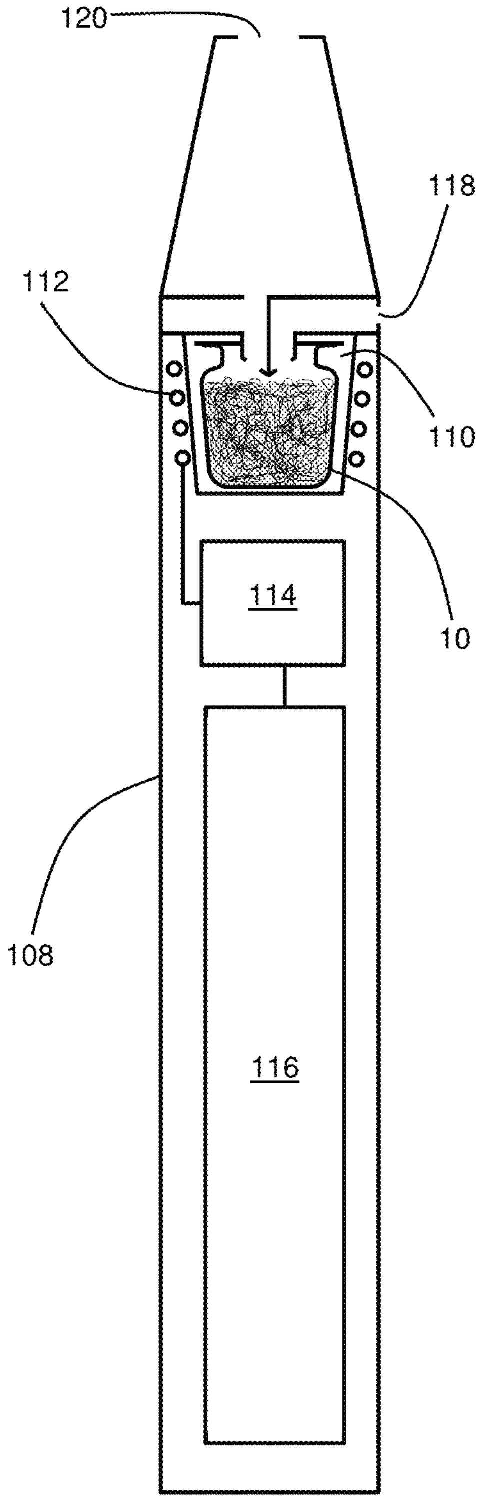
FIG. 3 is a cross-sectional view of the aerosol-generating system of FIG. 2 when fully assembled.

FIGS. 2 and 3 show an aerosol-generating system 100 according to an example embodiment. The aerosol-generating system 100 comprises the cartridge 10 of FIG. 1, a mouthpiece 102 having a piercing element 104 extending therefrom, and an aerosol-generating device 106. FIG. 2 shows the mouthpiece 102 separated from the aerosol-generating device 106 and FIG. 3 shows the mouthpiece 102 connected to the aerosol-generating device 106.

The aerosol-generating device 106 comprises a housing 108 defining a device cavity 110 for receiving the cartridge 10. When the cartridge 10 is received within the device cavity 110 and the mouthpiece 102 is connected to the aerosol-generating device 106, the piercing element 104 ruptures the seal 26 of the cartridge 10 so that at least a portion of the piercing element 104 is received within the cartridge cavity 14.

The aerosol-generating device 106 also comprises an electrical heater comprising an inductive heating element 112. The inductive heating element 112 comprises an induction coil positioned within the housing 108 and wrapped around the device cavity 110. Also positioned within the housing 108 are a controller 114 and an electrical power supply 116. During use, the controller 114 controls a supply of an oscillating electrical current from the electrical power supply 116 to the inductive heating element 112. The oscillating electrical current within the inductive heating element generates an alternating magnetic field that induces a voltage within the susceptor material 20 of the cartridge 10. The induced voltage heats the susceptor material which heats the aerosol-forming substrate 24. The heated aerosol-forming substrate melts and vaporises to form a vapour within the cartridge cavity 14. A draw on the mouthpiece 102 may draw air into the aerosol-generating system 100 via an airflow inlet 118. The air entering the airflow inlet 118 flows into the cartridge cavity 14 via a first airflow aperture in the piercing element 104, and out of the cartridge cavity 14 via a second airflow aperture in the piercing element 104. As the air flows through the cartridge cavity 14, the vaporised aerosol-forming substrate 24 is entrained in the airflow. The airflow and the vapour entrained therein flow from the second airflow aperture to an airflow outlet 120 in the mouthpiece 102.

Figure 4:
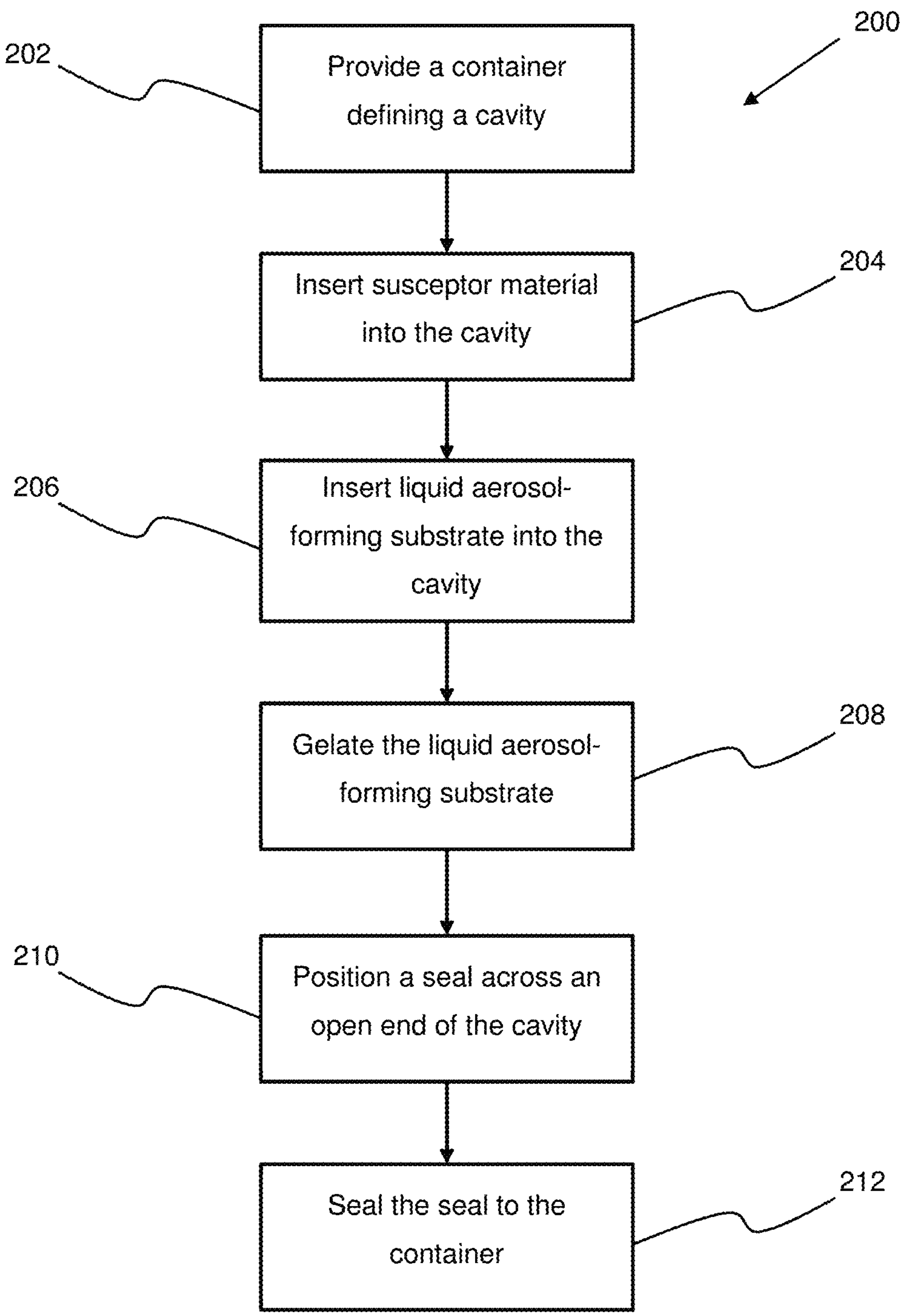
FIG. 4 is a flow diagram of a method of assembling a cartridge according to an example embodiment.

FIG. 4 shows a method 200 of assembling a cartridge for an aerosol-generating system, in accordance with an example embodiment. In a first step 202 a container is provided, the container defining a cartridge cavity. In a second step 204, a susceptor material is inserted into the cartridge cavity. The susceptor material defines a plurality of interconnected interstices. In a third step 206, a liquid aerosol-forming substrate is inserted into the cartridge cavity so that the liquid aerosol-forming substrate is positioned within the plurality of interconnected interstices. In a fourth step 208, the liquid aerosol-forming substrate is gelated to form a gel. In a fifth step 210, a seal is positioned across an open end of the cavity. In a sixth step 212, the seal is sealed to the container.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A cartridge for an aerosol-generating device, the cartridge comprising:

a container including a bottom wall and a side wall at least partially defining an interior region of the container;

a susceptor including a top surface, a bottom surface opposite the top surface, and a side surface between the top surface and the bottom surface, the susceptor in the interior region of the container such that the bottom surface of the susceptor contacts the bottom wall of the container and the side surface of the susceptor contacts the side wall of the container; and an aerosol-forming substrate intermeshed with the susceptor within the interior region, the aerosol-forming substrate being a gel with a stable form at room temperature.

2. The cartridge of claim 1, wherein the interior region, the susceptor, and the aerosol-forming substrate each define a cylindrical shape.

3. The cartridge of claim 2, wherein the cartridge has a diameter ranging from 4 mm to 10 mm.

4. The cartridge of claim 1, wherein the susceptor includes a susceptor material, and a coating on the susceptor material.

5. The cartridge of claim 4, wherein the coating includes a glass, a ceramic, or both a glass and a ceramic.

6. The cartridge of claim 1, wherein the susceptor includes metallic wool.

7. The cartridge of claim 1, wherein the susceptor includes metallic foam.

8. The cartridge of claim 7, wherein the metallic foam is an open-cell foam defining open cells.

9. The cartridge of claim 1, wherein the susceptor includes a ferromagnetic material.

10. The cartridge of claim 1, wherein the susceptor includes ferritic iron, ferromagnetic steel, stainless steel, or aluminum, or any combination thereof.

11. The cartridge of claim 1, wherein the container includes an open end and a closed end, the bottom wall at the closed end.

12. The cartridge of claim 11, further comprising:

a seal extending across the open end such that the susceptor and the aerosol-forming substrate are sealed within the interior region.

13. The cartridge of claim 12, wherein the seal includes a pressure activated valve configured to permit release of vapor through the pressured activated valve when a pressure difference across the pressure activated valve exceeds a desired pressure difference.

14. The cartridge of claim 1, further comprising:

a mouthpiece.

15. The cartridge of claim 14, wherein the mouthpiece includes a filter.

16. The cartridge of claim 14, wherein the mouthpiece includes an airflow modifier.

17. The cartridge of claim 1, wherein the gel is a thermoreversible gel.

18. The cartridge of claim 1, wherein the gel has a melting temperature of greater than or equal to 50° C.

19. The cartridge of claim 1, wherein the aerosol-forming substrate includes nicotine.

20. The cartridge of claim 1, wherein the aerosol-forming substrate includes tobacco.

* * * * *